United States Patent
Ramkull (10) Patent No.: US 11,838,890 B2
(45) Date of Patent: Dec. 5, 2023

(54) COMMUNICATION DEVICE, HOST AND METHODS THEREIN FOR HANDLING PAGING AND DATA EXCHANGING IN WIRELESS COMMUNICATION SYSTEM

(71) Applicant: Telefonaktiebolaget LM Ericsson (publ), Stockholm (SE)

(72) Inventor: Joachim Ramkull, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 26 days.

(21) Appl. No.: 17/059,842

(22) PCT Filed: Jun. 1, 2018

(86) PCT No.: PCT/EP2018/064469
§ 371 (c)(1),
(2) Date: Nov. 30, 2020

(87) PCT Pub. No.: WO2019/228642
PCT Pub. Date: Dec. 5, 2019

(65) Prior Publication Data
US 2021/0227493 A1    Jul. 22, 2021

(51) Int. Cl.
*H04W 4/80* (2018.01)
*H04W 68/02* (2009.01)
(Continued)

(52) U.S. Cl.
CPC ....... *H04W 68/005* (2013.01); *H04W 68/025* (2013.01); *H04W 76/28* (2018.02); *H04W 4/80* (2018.02)

(58) Field of Classification Search
CPC ... H04W 68/02; H04W 68/025; H04W 76/28; H04W 68/005; H04W 4/80; H04W 68/00
See application file for complete search history.

(56) References Cited

U.S. PATENT DOCUMENTS

| 2012/0238208 | A1 | 9/2012 | Bienas et al. | |
| 2017/0086054 | A1* | 3/2017 | Azevedo | H04W 4/70 |
| 2019/0387498 | A1* | 12/2019 | Li | H04W 68/08 |

FOREIGN PATENT DOCUMENTS

| GB | 2555662 | A * | 5/2018 | ........ H04W 52/0216 |
| GB | 2555662 | A | 5/2018 | |

(Continued)

OTHER PUBLICATIONS

International Search Report and Written Opinion dated Mar. 1, 2019 for International Application No. PCT/EP2018/064469 filed on Jun. 1, 2018, consisting of 9-pages.

(Continued)

*Primary Examiner* — Jinsong Hu
*Assistant Examiner* — Farideh Madani
(74) *Attorney, Agent, or Firm* — Christopher & Weisberg, P.A.

(57) ABSTRACT

A communication device and method therein for handling paging from a network node and data exchanging with a host. The communication device is one of a group of closely located communication devices capable of communicating with each other via a short-range wireless connection or a wired connection and is capable of communicating with the host over a long-range wireless connection via the network node. The communication device receives a page from the network node at a predefined occasion and evaluates if the page is targeted for itself or is targeted for one of the other devices in the group. When the page is targeted for itself, the communication device performs a paging response. When the page is targeted for one of the other devices in the group of closely located communication devices, the communication device forwards paging information to the targeted communication device.

13 Claims, 5 Drawing Sheets

(51) Int. Cl.
*H04W 68/00* (2009.01)
*H04W 76/28* (2018.01)

(56) References Cited

FOREIGN PATENT DOCUMENTS

| WO | 2016188680 | A1 | | 12/2016 | |
|----|------------|----|---|---------|---|
| WO | 2017196611 | A1 | | 11/2017 | |
| WO | WO-2017196611 | A1 | * | 11/2017 | ............ H04W 88/04 |
| WO | 2018082869 | A1 | | 5/2018 | |

OTHER PUBLICATIONS

Nagpurkar et al.; "An Overview of WSN and RFID Network Integration"; IEEE Sponsored Second International Conference on Electronics and Communication Systems, 2015, pp. 497-502, consisting of 6-pages.

Kocabas et al.; "Emerging Security Mechanisms for Medical Cyber Physical Systems"; IEEE/ACM Transactions on Computational Biology and Bioinformatics, May/Jun. 2016, pp. 401-416, vol. 13 No. 3, consisting of 16-pages.

3GPP TS 36.304 V13.6.0; 3rd Generation Partnership Project; Technical Specification Group Radio Access Network; Evolved Universal Terrestrial Radio Access (E-UTRA); User Equipment (UE) procedures in idle mode (Release 13); Jun. 2017, consisting of 46-pages.

3GPP TS 36.331 V13.6.1; 3rd Generation Partnership Project; Technical Specification Group Radio Access Network; Evolved Universal Terrestrial Radio Access (E-UTRA); Radio Resource Control (RRC); Protocol specification (Release 13); Jul. 2017, consisting of 46-pages.

Chinese Office Action and English translation dated Aug. 29, 2023 for Application No. 201880093864.9, consisting of 26 pages.

* cited by examiner

COMMUNICATION DEVICE, HOST AND METHODS THEREIN FOR HANDLING PAGING AND DATA EXCHANGING IN WIRELESS COMMUNICATION SYSTEM

CROSS-REFERENCE TO RELATED APPLICATIONS

This application is a Submission Under 35 U.S.C. § 371 for U.S. National Stage Patent Application of International Application Number: PCT/EP2018/064469, filed Jun. 1, 2018 entitled "COMMUNICATION DEVICE, HOST AND METHODS THEREIN FOR HANDLING PAGING AND DATA EXCHANGING IN WIRELESS COMMUNICATION SYSTEM," the entirety of which is incorporated herein by reference.

TECHNICAL FIELD

Embodiments herein relate to a communication device, a network node, a host and methods therein for handling paging and data exchanging. In particular, the embodiments herein relate to handling paging and data exchanging efficiently in terms of power and network resource in the communication device and the host in an Internet of Things (IoTs) communication system.

BACKGROUND

IoTs communication system is a network of physical objects or devices, buildings, sensors, computers, servers or hosts and other items connected through software and/or wireless communication networks. IoTs communication may comprise paging, signaling, exchange of data, measurement data, configuration information etc. To save power and network resources in a long-range IoTs wireless system with User Equipment (UE) having limited battery capacity, long Discontinuous Reception (DRX) cycles are utilized. Since the UE will then check for paging seldom, the latency to page a UE is considerable. To transmit data to a host in the network also requires power and network resources and is therefore made as seldom as possible. The resolution in time of the data collected from the UEs is therefore low.

Terms host, server, computer herein refer to a device used for running one or several application programs or provide functionality for other programs or devices. For example, in an application for home automation, where the host collects on demand or on alarm data from other sensors or devices, e.g. temperature in rooms, freezer and fridge, status of door locks, fire alarm, water leakage detector etc. The host may also control e.g. temperature in rooms, freezer and fridge, lock/unlock of door locks etc. In this example the long-range connection may connect the devices with the host, e.g. an alarm central supervising several houses. The host, server, computer may be used interchangeably in the present application. A host can be regarded as being inside the wireless communication network if it is controlled or administered by the operator of the wireless communication network, but also outside the wireless communication network if it is controlled or administered by another entity or company.

SUMMARY

It is therefore an object of embodiments herein to provide an improved method and apparatus for handling paging and data transmission in a wireless communication network.

According to one aspect of embodiments herein, the object is achieved by a method performed in a communication device for handling paging from a network node and data exchanging with a host, in a wireless communication system. The wireless communication device is one of a group of closely located communication devices being capable of communicating with each other via a short-range wireless connection or a wired connection. Each communication device is capable of communicating with the host via a long-range wireless connection. The communication device receives a page from the network node at a predefined occasion. The communication device evaluates if the page is targeted for itself or is targeted for one of the other devices in the group of closely located communication devices. The communication device performs a paging response when the page is targeted for itself. The communication device forwards paging information to the targeted communication device via the short-range wireless connection or the wired connection when the page is targeted for one of the other devices in the group of closely located communication devices.

According to one aspect of embodiments herein, the object is achieved by a communication device for handling paging from a network node and data exchanging with a host in a wireless communication system. The wireless communication device is one of a group of closely located communication devices being capable of communicating with each other via a short-range wireless connection or a wired connection. Each communication device is capable of communicating with the host via a long-range wireless connection. The communication device is configured to receive a page from the network node at a predefined occasion. The communication device is further configured to evaluate if the page is targeted for itself or is targeted for one of the other devices in the group of closely located communication devices. The communication device is further configured to perform a paging response when the page is targeted for itself. The communication device is further configured to forward paging information to the targeted communication device via the short-range wireless connection or the wired connection when the page is targeted for one of the other devices in the group of closely located communication devices.

According to one aspect of embodiments herein, the object is achieved by a method performed in a host for exchanging data with a communication device in a wireless communication system. The communication device is one of a group of closely located communication devices being capable of communicating with each other via a short-range wireless connection or a wired connection. Each communication device is capable of communicating with the host over a long-range wireless connection via a network node. The host sends data or indication to the network node for triggering paging procedure in the network node when the host intends to exchange data with one or more than one of the group of closely located communication devices in the wireless communication system. The page from the network node is at a predefined occasion via the long-range wireless connection. A device identity or additional index or offset parameter is included in the paging message to indicate which device the page is targeted for.

The host sends data via the network node to the paged communication device or the targeted communication device.

According to one aspect of embodiments herein, the object is achieved by a host for exchanging data with a communication device in a wireless communication system.

The communication device is one of a group of closely located communication devices being capable of communicating with each other via a short-range wireless connection or a wired connection. Each communication device is capable of communicating with the host over a long-range wireless connection via a network node. The host is configured to send data or indication to the network node for triggering paging procedure in the network node when the host intends to exchange data with one or more than one of the group of closely located communication devices in the wireless communication system. The page from the network node is at a predefined occasion via the long-range wireless connection. A device identity or additional index or offset parameter is included in the paging message to indicate which device the page is targeted for.

The host is further configured to send data via the network node to the paged communication device or the targeted communication device.

In other words, according to the embodiments herein, a group of communication devices, e.g. IoT-devices, have a short-range low power wireless connection, e.g. Bluetooth Low Energy (BLE) or even a wired connection, between the closely located devices in addition to the long-range wireless connection with the host.

The paging occasions may then be coordinated so that the devices may be paged more often, e.g. 10 times as often for a group of 10 closely located devices. The device that receives a page checks for which device the page is targeted for and if it is not for the receiving device, the page will be forwarded to the paged device via the short-range connection to the targeted device.

Similarly, when a communication device or an IoT device has data to transmit to the host, the transmissions may be coordinated between the devices, e.g. at regular intervals or when "urgent" data is to be sent, so that the devices via the short-range interconnection send data to the device that will perform the transmission and then the device that has transmission opportunity will send the data to the host over the long-range wireless connection.

The data transmission from the host can also be coordinated, so that the host sends data for several of the devices over the long-range wireless connection to one of the devices. The receiving device will then distribute data destined for the other devices via the short-range interconnection.

In this way, the closely located communication devices or IoT devices may be reached or communicated more often while individually utilizing a long and power saving DRX cycle on the long-range wireless connection. The communication devices or IoT devices and the host may also save power and network resources by coordinating the uplink and downlink transmissions within the closely located group of devices, since less signalling is required compared to if each of the devices should setup an individual Radio Resource Control (RRC) Connection.

Therefore, the embodiments herein provide an improved method and apparatus for handling paging and data transmission in a wireless communication system.

BRIEF DESCRIPTION OF THE DRAWINGS

Examples of embodiments herein are described in more detail with reference to attached drawings in which.

DETAILED DESCRIPTION

With IoTs, it should be a common scenario that several related IoT devices are in close proximity of each other but may be far away from the host that interacts with the IoT devices, e.g. IoT devices in a vehicle or in a house. For this reason, there is a need for the host to have a long-range wireless connection with the devices, e.g. Narrowband IoT (NB-IoT) or LTE category M for IoT devices CAT-M. To be power and resource efficient the long-range wireless connection enables long DRX cycles, e.g. for NB-IoT up to several hours. To transmit data to the host also requires considerable power and is for this reason likely made seldom.

To save power and network resources and at the same time enable transmission of data more often, the embodiments herein provide methods and apparatus for handling paging and data transmission efficiently in a wireless communication system.

Figure 1:
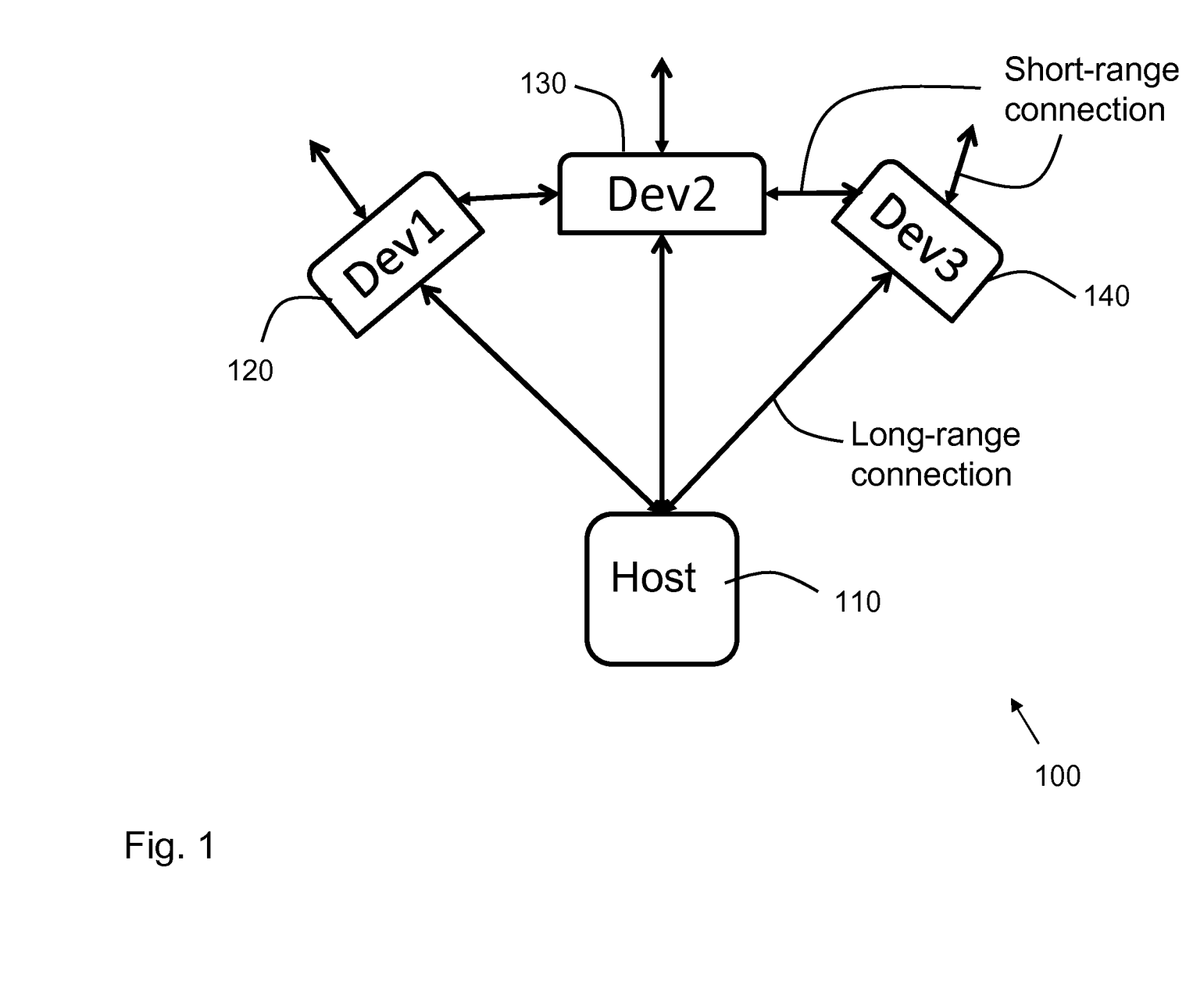
FIG. 1 is a schematic block diagram illustrating a wireless communication system.

FIG. 1 depicts an example of a wireless communication system or network 100 in which embodiments herein may be implemented. The wireless communication system 100 may be a long-range wireless system utilizing DRX and paging with long cycles, such as a Long Term Evolution (LTE) network or an Internet of Things (IoTs) communication system, e.g. Narrow-band IoT. The wireless communication system 100 may also be any other wireless system or cellular network, such as any $3^{rd}$ Generation Partnership Project (3GPP) cellular network, Worldwide interoperability for Microwave Access (WiMAX) network, Wireless Local Area Network (WLAN/Wi-Fi), a Fourth Generation (4G) or LTE advanced network, a Fifth Generation (5G) or New Radio (NR) network etc.

The wireless communication system 100 comprises a host 110, which has a long-range wireless connection with multiple communication devices 120, 130, 140, e.g. Dev1, Dev2, Dev3 etc., via e.g. a network node, which may also be referred as a base station or an access node (not shown). The host 110 needs to exchange data with one or more than one of the communication devices 120, 130, 140 at different occasions or at the same time. The host sends data or indication to the network node when it intends to send data. The network node then pages a communication device and receives a paging response from the communication device.

The multiple communication devices 120, 130, 140 are closely located, and have a short-range low power wireless connection, e.g. Bluetooth Low Energy (BLE) or even a wired connection between them in addition to the long-range wireless connection with the host 110.

Figure 2:
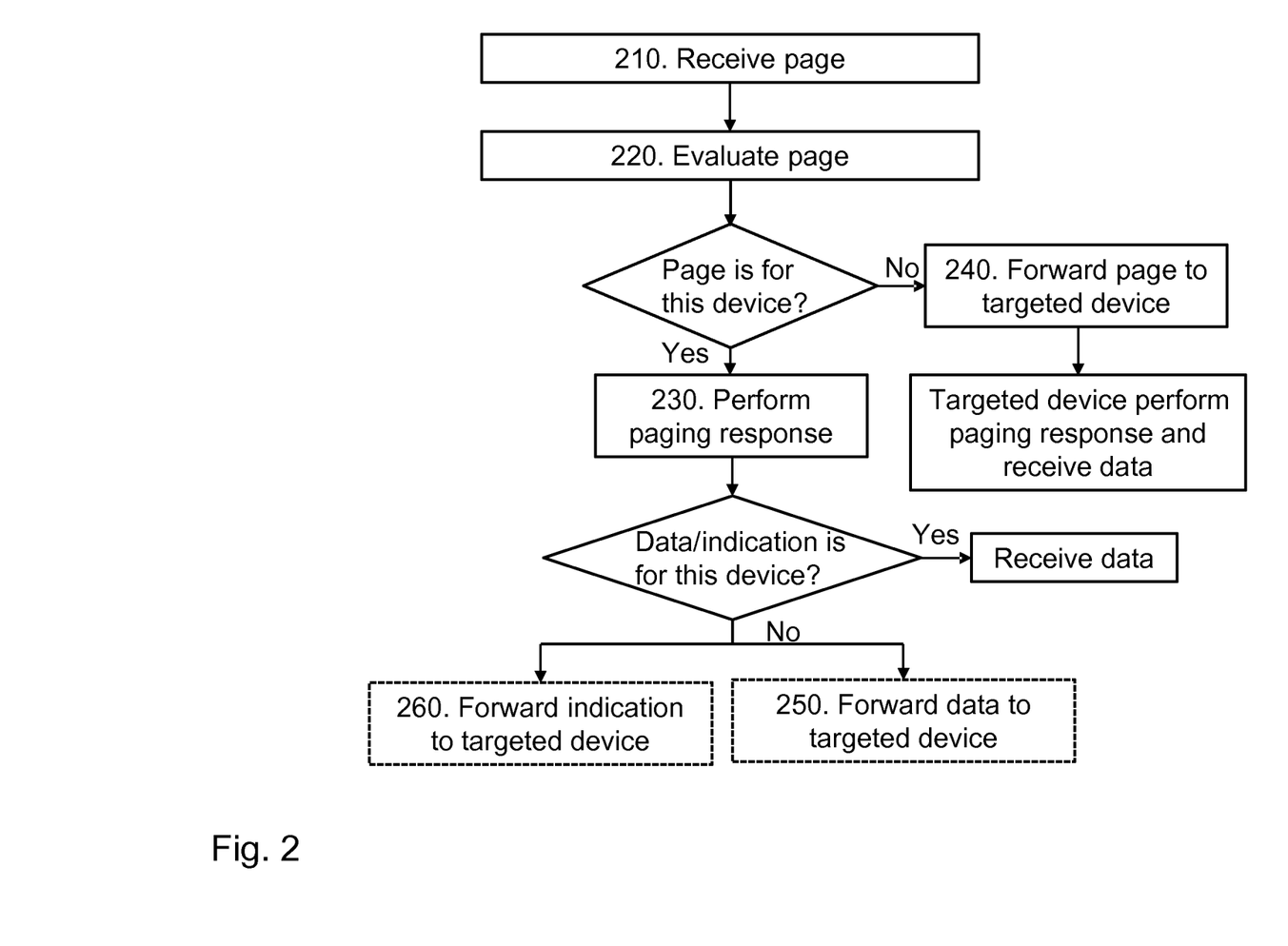
FIG. 2 is a flow chart illustrating a method performed in a communication device according to embodiments herein.

Example of embodiments of a method performed in a communication device 120, 130, 140 for handling paging from a network node and data exchanging with a host 110 in a wireless communication system 100 will now be described with reference to FIG. 2. The communication device 120 is one of a group of closely located communication devices 120, 130, 140 being capable of communicating with each other via a short-range wireless connection or a wired connection. Each communication device 120, 130, 140 is capable of communicating with the host 110 by a long-range wireless connection via the network node. The host 110 may be part of the wireless communication network 100, or considered outside the wireless communication network 100. The host functionality may be running on a dedicated device or on a device running also other functionality. The host functionality may also be located in the cloud. The host functionality may even be running on a mobile device, that is not in the proximity of, and part of, the local communication possibilities which are made possible by the short-range wireless connections. The communication device 120, 130, 140 may be any one of a UE or a mobile device etc. The network node may be any one of a base station, an access node etc. The different standards have different names for these devices like e.g. eNB, gNB, etc. The method comprises the following actions.

Action 210

The communication device 120 receives a page from a network node at a predefined occasion.

The Paging Occasions (PO) of the closely located devices 120, 130, 140 may preferably be evenly spread over a DRX cycle. So according to some embodiments, the predefined occasion for each communication device to receive paging message may be evenly spread over a DRX cycle.

In a Radio Access Technology (RAT) where an identity of a communication device is part of the calculation of the PO, this may be achieved by selecting the identities for the group of closely located communication devices so that the POs of the communication devices are evenly spread over the DRX cycle. In other RATs there may be an additional index or offset parameter in the calculation of the PO to achieve an even distribution of the POs of the group of closely located communication devices. The additional index or offset parameter then indicates the relative paging position for the device within the group of closely located devices.

Action 220

The communication device 120 evaluates if the paging message is targeted for itself or is targeted for one of the other devices in the group of closely located communication devices 130,140.

The actual page may be performed in different ways, depending on how the actual target of the page is indicated.

If the communication device 140 is to be paged but the communication device 120 is next to be paged, the communication device 120 will be paged and the paging message may indicate in an optional parameter that the communication device 140 is the target for the page or if the optional parameter is not set, the page is for the device receiving the page.

Action 230

When the page is targeted for itself, the communication device 120 performs a paging response.

Action 240

When the page is targeted for one of the other devices in the group of closely located communication devices, the communication device 120 forwards paging information to the targeted communication device via the short-range wireless connection or the wired connection.

For example, if the communication device 140 is to be paged but the communication device 120 is next to be paged according to the predefined PO, the communication device 120 will be paged and the page may indicate in an optional parameter that the communication device 140 is the target for the page. Since the paging format on the short-range connection may not be the same as on the long-range connection the communication device 120 then sends paging information to the communication device 140 according to the short-range wireless communications protocol. The communication device 140, i.e. the targeted device, will then perform a paging response.

In connection with the paging response, the communication device 120 may receive data which is for itself.

In connection with the paging response, the communication device 120 may receive data and/or indication indicating that the data is for other device, e.g. the communication device 140, i.e. Dev3, in the group. The communication device 120 will then forward the data to Dev3. If Dev3 is to receive a substantial amount of data, it may be more efficient if Dev3 only receives the indication from the communication device 120 and then establish an RRC connection to receive the actual data.

Therefore, according to some embodiments herein, the communication device 120 which is paged may check if data and/or indication received is for itself or is for another device. If the data and/or indication is for itself, the communication device 120 receives the data. If the data and/or indication is for another device, the method may further comprise the following actions:

Action 250

The communication device 120 may forward the data to a targeted communication device via the short-range wireless connection or the wired connection if it is indicated that the data is targeted for one of the other devices in the group of closely located communication devices.

Action 260

The communication device 120 may forward the indication to a targeted communication device via the short-range wireless connection or the wired connection to enable the targeted communication device to establish a connection with the host for receiving data via a long-range wireless connection.

Actions 250 and 260 are optional and only performed when the data or indication received in connection with the paging response is for another device than the one receiving the page. If the data received by the paged device is the complete data to be sent to the other device or an indication that the other device needs to set up an RRC Connection to receive the complete data, the communication device 120 may forward the data or indication to the targeted communication device. If only a small amount of data is to be received, this may be conveyed via the communication device receiving the page. However if a larger amount of data is to be received, it is more efficient to have the data sent directly from the host to the "other" device because the overhead to send a large amount of data over two connections, one long-range and one short-range, is likely larger than the overhead of the extra RRC Connection setup.

It may also be that the host 110 would like to exchange data with more than one or all of the closely located devices 120, 130, 140 at the same time. Similarly, it is then only necessary for the network node to page one of the communication devices, i.e. the next device to be paged. This communication device will then forward the paging information to the other devices of the group. Each communication device may receive its data from the paged device. It would be more complex and not so efficient if each of the communication devices should do a paging response. So according to the embodiments herein, the POs of the group of closely located devices are utilizing a long DRX cycle to save power and use the coordinated paging to still be able to be reached or communicated more often than the actual PO of each device. The relation of power consumption on the long-range connection versus the short-range connection is to determine when the coordinated paging is more efficient as compared to being paged more often according to the long-range protocol. The power consumption for data reception and transmission in some short-range connections should be considerably lower than the power consumption for data reception and transmission according to the long-range protocol. Since every device within a group of n closely located devices will likely have to wake up every time there is a PO according to the long-range protocol, the power consumption of the short-range communication should likely be at least n times lower than the power consumption of the long-range communication.

According to some embodiments herein, uplink transmission may also be coordinated between a group of closely located devices to save power. The method may further comprise the following actions and will now be described with reference to FIG. 3.

Action 310

Figure 3:
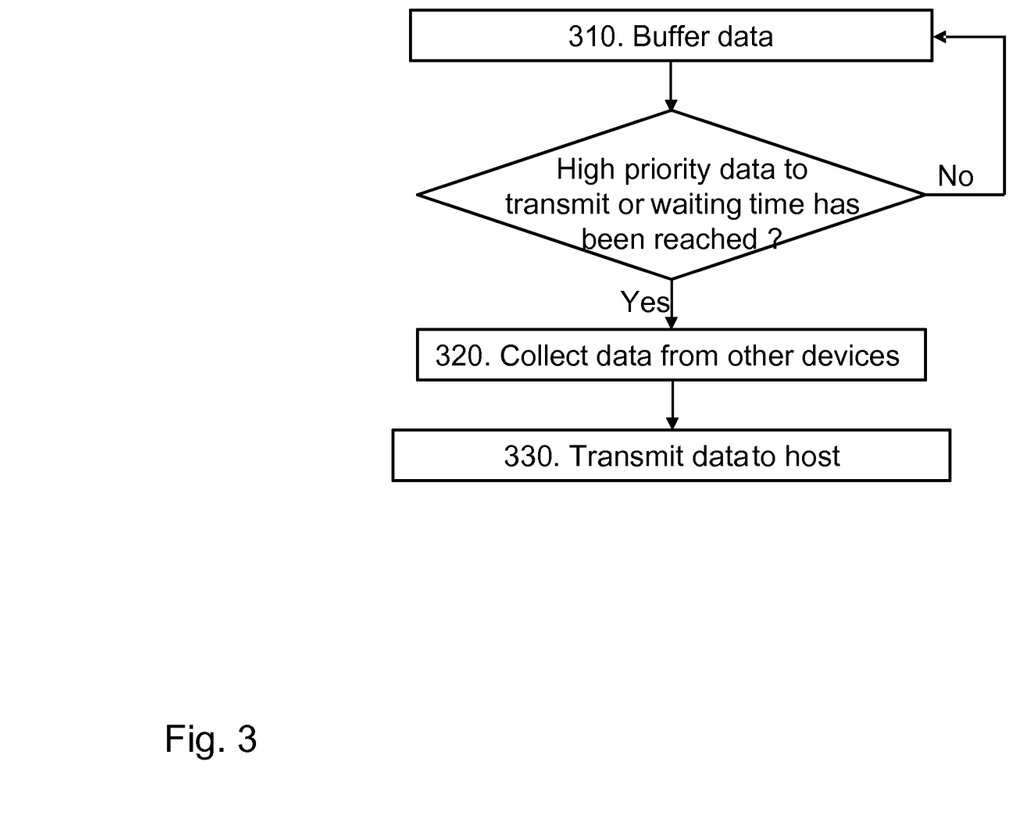
FIG. 3 is a flow chart illustrating a method performed in a communication device according to embodiments herein.

When there is no transmission opportunity, each of the communication devices 120, 130, 140 in the group buffers data that has lower priority to be transmitted.

Action 320

If any of the communication devices 120, 130, 140 has high priority data to be transmitted to the host 110 or a certain time has been reached, the communication device will first via the short-range connection check if any of the other communication devices have lower priority data buffered and are waiting for the next transmission opportunity.

If this is the case, the communication device which has transmission opportunity, e.g. the communication device 120, collects data from the other devices in the group of closely located communication devices via the short-range connection or the wired connection prior to establishing a radio resource control connection with the network node for sending data to the host 110.

The certain time may be a maximum waiting time when there has been no high priority data sent. The certain time may also be a predefined regular interval.

Action 330

The buffered data from the communication device 120 which has transmission opportunity and collected data from the other devices 130, 140 will then be transmitted to the host 110. That is the communication device 120 transmits the complete data to the host 110 via the long-range wireless connection.

According to some embodiments herein, the data transmission from the host 110 may also be coordinated. Example of embodiments of a method performed in a host 110 for exchanging data with a communication device 120, 130, 140 in a wireless communication system 100 will now be described with reference to FIG. 4. The communication device 120 is one of a group of closely located communication devices being capable of communicating with each other via a short-range wireless connection or a wired connection. Each communication device 120, 130, 140 is capable of communicating with the host 110 over a long-range wireless connection via a network node. The method comprises the following actions:

Action 410

Figure 4:
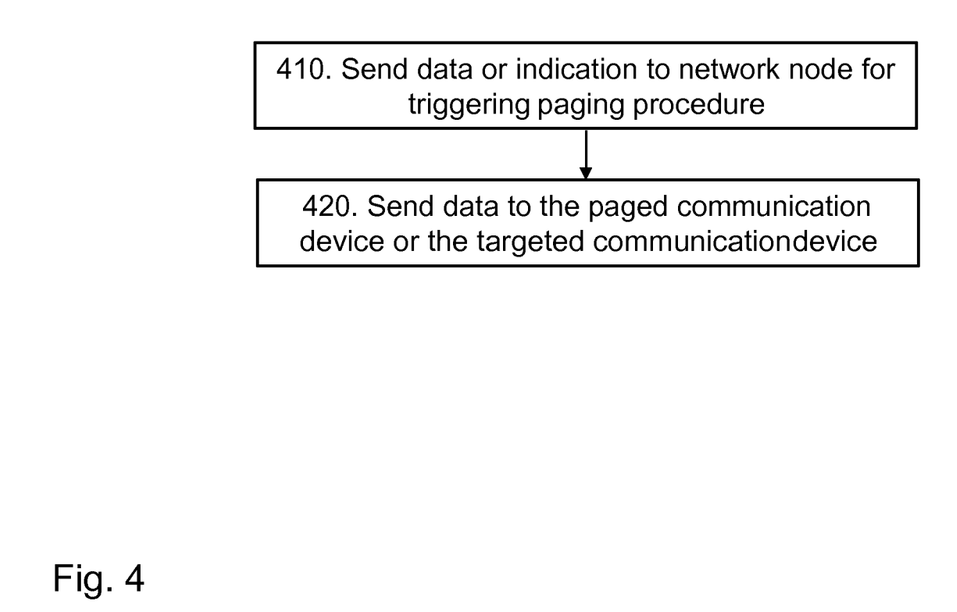
FIG. 4 is a flow chart illustrating a method performed in a host according to embodiments herein.

The host 110 sends data or indication to the network node for triggering paging procedure in the network node when it intends to exchange data with one or more than one of the group of closely located communication devices. The network node pages a communication device at a predefined occasion via the long-range wireless connection. A device identity or additional index or offset parameter is included in the paging message to indicate which device the page is targeted for. The predefined occasion may be evenly spread over a Discontinuous Reception, DRX, cycle.

Action 420

The host 110 sends data to the paged communication device or the targeted communication device. So the host 110 may send data for several of the communication devices over the long-range wireless connection to one of the communication devices, e.g. the communication device 120. The receiving communication device will then distribute data destined for the other devices via the short-range interconnection.

This will also save power and network resources since less signaling is required compared to if each of the devices should setup an individual RRC Connection to receive or send data. Also here the power consumption for data reception and transmission in the short-range connection should be considerably lower than the power consumption for data reception and transmission according to the long-range protocol.

Figure 5:
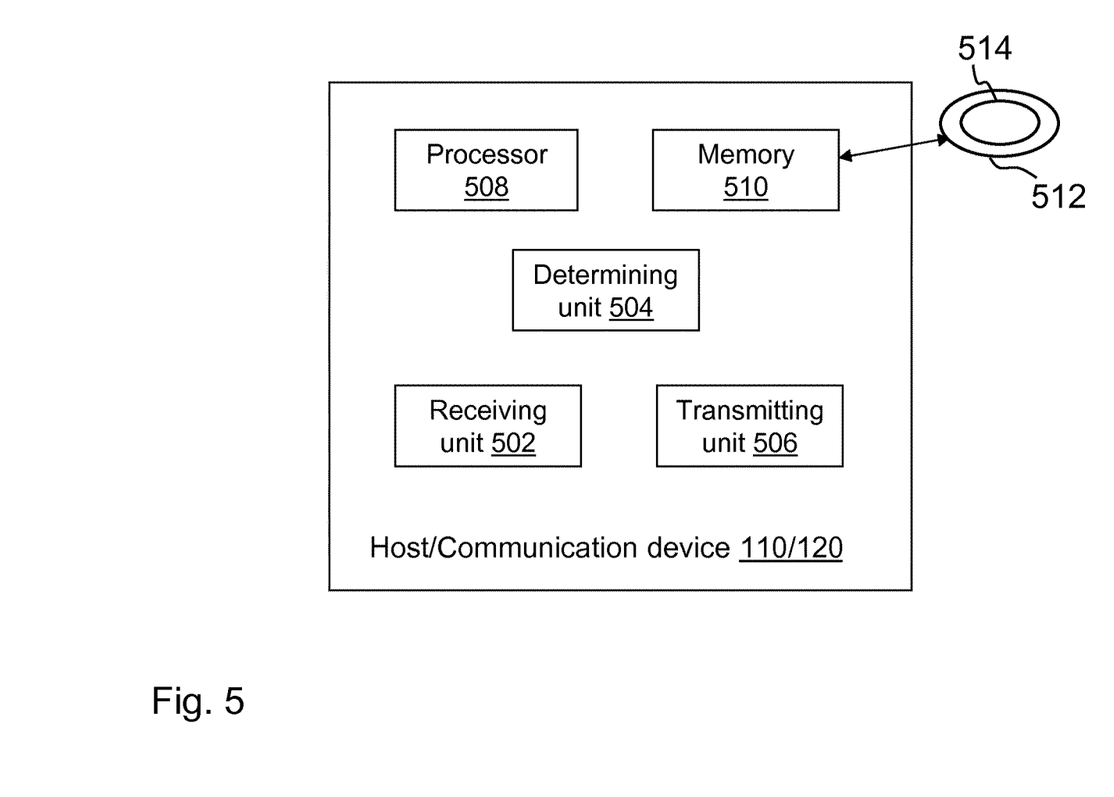
FIG. 5 is a schematic block diagram illustrating embodiments of a communication device or host.

To perform the method actions in the communication device 120 for handling paging from a network node and data exchanging with a host in a wireless communication system 100, the communication device 120 comprises circuits or units as depicted in FIG. 5. The communication device 120 comprises e.g. a receiving unit 502, a determining unit 504, a transmitting unit 506, a processor 508 and a memory 510.

According to the embodiments herein, the communication device 120 is configured to, e.g. by means of the receiving unit 502 being configured to, receive a page from the network node at a predefined occasion.

According to the embodiments herein, the communication device 120 is further configured to, e.g. by means of determining unit 504 being configured to, evaluate if the page is targeted for itself or is targeted for one of the other devices in the group of closely located communication devices 130,140.

According to the embodiments herein, when the page is targeted for itself, the communication device 120 is further configured to, e.g. by means of the transmitting unit 506 and receiving unit 502 being configured to, perform a paging response.

According to the embodiments herein, when the page is targeted for one of the other devices in the group of closely located communication devices, the communication device 120 is further configured to, e.g. by means of the transmitting unit 506 being configured to, forward paging information to the targeted communication device via the short-range wireless connection or the wired connection.

According to some embodiments herein, the communication device 120 may be further configured to, e.g. by means of the receiving unit 502 being configured to, receive data and/or indication from the host (110).

According to some embodiments herein, the communication device 120 may be further configured to, e.g. by means of the transmitting unit 506 being configured to, forward the data to a targeted communication device via the short-range wireless connection or the wired connection if it is indicated that the data is targeted for one of the other devices in the group of closely located communication devices.

According to some embodiments herein, the communication device 120 may be further configured to, e.g. by means of the transmitting unit 506 being configured to, forward the indication to a targeted communication device via the short-range wireless connection or the wired connection to enable the targeted communication device to establish a connection with the host for receiving data via a long-range wireless connection.

According to some embodiments herein, the communication device 120 may be further configured to, e.g. by means of determining unit 504 being configured to, buffer data that has lower priority to be transmitted.

When there is high priority data to be transmitted or a certain time has been reached, the communication device 120 may be further configured to, e.g. by means of receiving unit 502 being configured to, collect data from the other devices in the group of closely located communication devices via the short-range wireless connection or the wired connection, and by means of transmitting unit 506 being configured to, transmit the buffered and collected data to the host via a long-range wireless connection.

To perform the method actions in the host 110 for exchanging data with a communication device in a wireless communication system 100, the host 110 comprises similar circuits or units as the communication device 120, depicted in FIG. 5. The host 110 comprises e.g. a receiving unit 502, a determining unit 504, a transmitting unit 506, a processor 508 and a memory 510.

According to the embodiments herein, the host 110 is configured to, e.g. by means of the transmitting unit 506 being configured to, send data or indication to a network node for triggering paging procedure in the network node when it intends to exchange data with one or more than one of the group of closely located communication devices. The network node then pages a communication device at a predefined occasion via the long-range wireless connection. A device identity or additional index or offset parameter may be included in the paging message to indicate which device the page is targeted for.

The host 110 is further configured to, e.g. by means of the transmitting unit 506 being configured to, send data to the paged communication device or the targeted communication device. The host may get a confirmation of successful delivery of the data sent, if there was a paging response from the paged device or failure to deliver the data, if there is no paging response from the paged device and the paging attempt times out.

In summary, according to the embodiments herein, the closely located communication devices, e.g. IoT devices, may be reached or communicated more often while individually utilizing a long and power saving DRX cycle. The communication devices or IoT devices and the host may also save power and network resources by coordinating the uplink and downlink transmissions within the closely located group of devices.

Those skilled in the art will appreciate that the receiving unit 502, the determining unit 504 and the transmitting unit 506 described above in the host/communication device 110/120 may be referred to one circuit/unit, a combination of analog and digital circuits, one or more processors configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The embodiments herein for handling paging and data exchanging in the host/communication device 110/120 may be implemented through one or more processors, such as the processor 508 together with computer program code for performing the functions and actions of the embodiments herein. The program code mentioned above may also be provided as a computer program product, for instance in the form of a data carrier 512 carrying computer program code 514, as shown in FIG. 5, for performing the embodiments herein when being loaded into the host/communication device 110/120. One such carrier may be in the form of a CD ROM disc. It is however feasible with other data carriers such as a memory stick. The computer program code may furthermore be provided as pure program code on a server and downloaded to the host/communication device 110/120.

The memory 510 in the host/communication device 110/120 may comprise one or more memory units and may be arranged to be used to store received information, measurements, data, configurations and applications to perform the method herein when being executed in the host/communication device 110/120.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method performed in a communication device for handling paging from a network node and data exchanging with a host, in a wireless communication system, the communication device being one of a group of closely located communication devices configured to communicate with each other via at least one of a short-range wireless connection and a wired connection, and each communication device of the group is configured to communicate with the host over a long-range wireless connection via the network node, the method comprising:
  receiving a page from the network node at a predefined occasion;
  evaluating if the page is one of targeted for itself and is targeted for one of the other communication devices in the group of closely located communication devices;
  when the page is targeted for itself, performing a paging response;
  when the page is targeted for one of the other communication devices in the group of closely located communication devices, forwarding paging information to the targeted communication device via the short-range wireless connection or the wired connection;
  receiving at least one of data and an indication from the host;
  when the received indication indicates the data is targeted for one of the other communication devices in the group of closely located communication devices, forwarding the data to a targeted communication device via one of the short-range wireless connection and the wired connection;
  when there is data that has a first priority to be transmitted to the host by at least one of the other communication devices in the group of closely located communication devices, collecting the data that has the first priority from the at least one of the other communication devices in the group of closely located communication devices; and
  buffering data that has a second priority to be transmitted to the host by the at least one of the other communication devices in the group of closely located communication devices, the first priority to be transmitted being higher than the second priority to be transmitted, each communication device of the group of closely located communication devices being a first type of wireless communication system component, the network node being a second type of wireless communication system component different from the first type of wireless communication system component.

2. The method according to claim 1, wherein the predefined occasion for each communication device to receive page is evenly spread over a Discontinuous Reception, DRX, cycle.

3. The method according to claim 2, further comprising receiving at least one of data and an indication from the host.

4. The method according to claim 2,
wherein the collection of data from the other communication devices in the group of closely located communication devices is performed via one of the short-range wireless connection and the wired connection; and
the method further comprises transmitting the buffered and collected data to the host via a long-range wireless connection.

5. The method according to claim 1, further comprising forwarding the indication to a targeted communication device via one of the short-range wireless connection and the wired connection to enable the targeted communication device to establish a connection with the host for receiving data via a long-range wireless connection.

6. The method according to claim 1, wherein the collection of data from the other communication devices in the group of closely located communication devices is performed via one of the short-range wireless connection and the wired connection; and
the method further comprises transmitting the buffered and collected data to the host via a long-range wireless connection.

7. The method according to claim 6, wherein the data that has the first priority is collected when one or both there is data that has the first priority and a certain time has been reached, the certain time being a maximum waiting time when there has been no data, having the first priority, sent.

8. The method according to claim 7, wherein the certain time is a predefined regular interval.

9. The method according to claim 1, wherein the group of closely located communication devices are Internet of Things, IoTs, in a wireless communication system.

10. A communication device for handling paging from a network node and data exchanging with a host, in a wireless communication system, the communication device being one of a group of closely located communication devices configured to communicate with each other via at least one of a short-range wireless connection and a wired connection, and each communication device of the group is configured to communicate with the host over a long-range wireless connection via the network node, the communication device is configured to:

receive a page from the network node at a predefined occasion;
evaluate if the page is one of targeted for itself and is targeted for one of the other communication devices in the group of closely located communication devices;
when the page is targeted for itself, perform a paging response;
when the page is targeted for one of the other communication devices in the group of closely located communication devices, forward paging information to the targeted communication device via the short-range wireless connection or the wired connection; and
receive at least one of data and an indication from the host;
when the received indication indicates the data is targeted for one of the other communication devices in the group of closely located communication devices, forward the data to a targeted communication device via one of the short-range wireless connection and the wired connection;
when there is data that has a first priority to be transmitted to the host by at least one of the other communication devices in the group of closely located communication devices, collect the data that has the first priority from the at least one of the other communication devices in the group of closely located communication devices; and
buffer data that has a second priority to be transmitted to the host by the at least one of the other communication devices in the group of closely located communication devices, the first priority to be transmitted being higher than the second priority to be transmitted, each communication device of the group of closely located communication devices being a first type of wireless communication system component, the network node being a second type of wireless communication system component different from the first type of wireless communication system component.

11. The communication device according to claim 10, wherein the predefined occasion for each communication device to receive a page is evenly spread over a Discontinuous Reception, DRX, cycle.

12. The communication device according to claim 10, further configured to forward the indication to a targeted communication device via one of the short-range wireless connection and the wired connection to enable the targeted communication device to establish a connection with the host for receiving data via a long-range wireless connection.

13. The communication device according to claim 10,
wherein the collection of data from the other communication devices in the group of closely located communication devices is performed via one of the short-range wireless connection and the wired connection; and
the communication device is further configured to transmit the buffered and collected data to the host via a long-range wireless connection.

* * * * *